United States Patent
Agarwal et al.

(10) Patent No.: US 12,441,866 B1
(45) Date of Patent: Oct. 14, 2025

(54) NANOCOMPOSITES COMPRISING 2D MATERIALS AND A SHAPE MEMORY POLYMER AND FABRICATION METHODS THEREOF

(71) Applicants: Arvind Agarwal, Miami, FL (US);
Luiza Benedetti, Miami, FL (US);
Kazue Orikasa, Miami, FL (US);
Branon Aguiar, Miami, FL (US)

(72) Inventors: Arvind Agarwal, Miami, FL (US);
Luiza Benedetti, Miami, FL (US);
Kazue Orikasa, Miami, FL (US);
Branon Aguiar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/750,494

(22) Filed: Jun. 21, 2024

(51) Int. Cl.
| | |
|---|---|
| C08K 3/04 | (2006.01) |
| B29C 64/209 | (2017.01) |
| B33Y 10/00 | (2015.01) |
| B33Y 70/00 | (2020.01) |
| B33Y 80/00 | (2015.01) |
| B82Y 30/00 | (2011.01) |
| B82Y 40/00 | (2011.01) |
| C08G 18/10 | (2006.01) |
| C08K 3/30 | (2006.01) |
| C08K 3/38 | (2006.01) |

(52) U.S. Cl.
CPC ............ *C08K 3/042* (2017.05); *B29C 64/209* (2017.08); *C08G 18/10* (2013.01); *C08K 3/30* (2013.01); *C08K 3/38* (2013.01); *B33Y 10/00* (2014.12); *B33Y 70/00* (2014.12); *B33Y 80/00* (2014.12); *B82Y 30/00* (2013.01); *B82Y 40/00* (2013.01); *C08G 2280/00* (2013.01); *C08K 2003/3009* (2013.01); *C08K 2003/385* (2013.01); *C08K 2201/011* (2013.01)

(58) Field of Classification Search
CPC .. B33Y 10/00; B29C 64/00–209; C08K 3/042
See application file for complete search history.

(56) References Cited

U.S. PATENT DOCUMENTS

2016/0325491 A1\* 11/2016 Sweeney ................. D01F 11/04

\* cited by examiner

*Primary Examiner* — Wenwen Cai
(74) *Attorney, Agent, or Firm* — SALIWANCHIK, LLOYD & EISENSCHENK

(57) ABSTRACT

Nanocomposites and fabrication methods thereof are provided. The nanocomposites can include two-dimensional (2D) material and one or more shape memory polymers (SMPs), thereby combining the unique properties of SMPs with the exceptional attributes of 2D materials. The nanocomposites exhibit enhanced mechanical, thermal, electrical, and radiation shielding properties. 2D materials can be integrated into three-dimensional (3D)-printed SMPs, allowing for development of smart and complex-shaped nanocomposites.

9 Claims, 8 Drawing Sheets

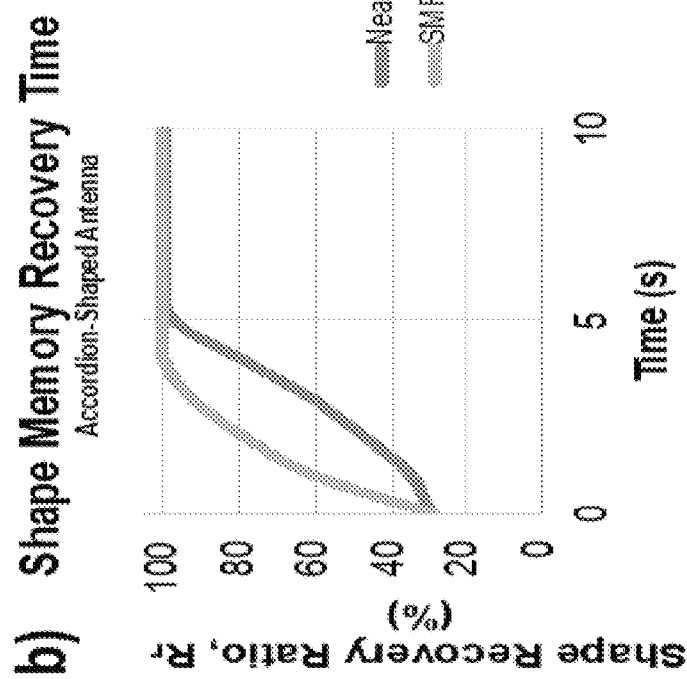
FIG. 6b
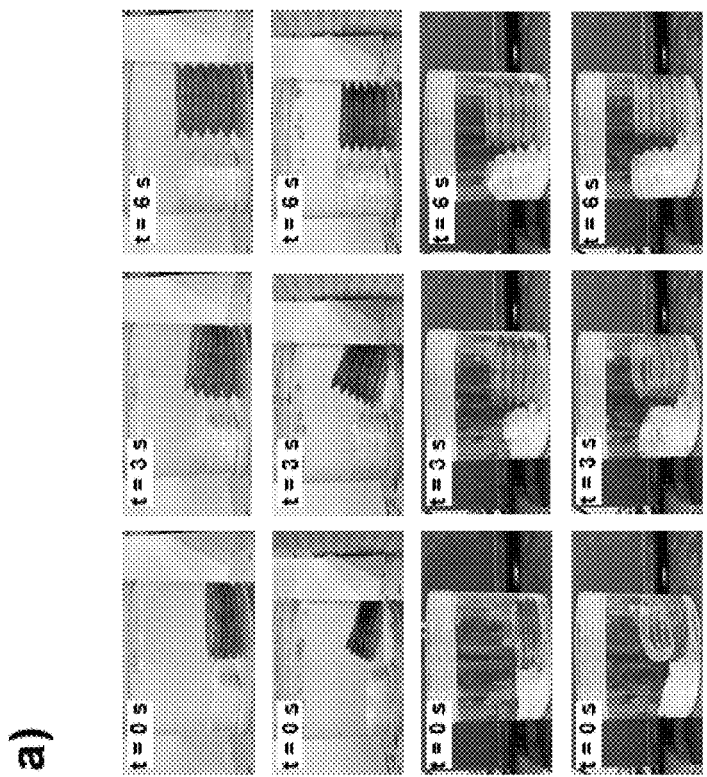
FIG. 6a
FIG. 6c

NANOCOMPOSITES COMPRISING 2D MATERIALS AND A SHAPE MEMORY POLYMER AND FABRICATION METHODS THEREOF

GOVERNMENT SUPPORT

This invention was made with government support under FA9550-21-1-0460 awarded by the Air Force Research Laboratory. The government has certain rights in the invention.

BACKGROUND

Shape memory polymers (SMPs) are a new class of polymers that can respond to certain stimuli, such as temperature changes, and deform from a temporary shape to an original shape. SMPs offer the possibility to custom design devices with unique functionalities, such as self-deployable structures, sensors, and actuators. However, SMPs have significant drawbacks that limit their applications, such as their poor mechanical, thermal, electrical, and radiation shielding properties.

BRIEF SUMMARY

Embodiments of the subject invention provide novel and advantageous nanocomposites and fabrication methods thereof. The nanocomposites can include two-dimensional (2D) material and one or more shape memory polymers (SMPs), thereby combining the unique properties of SMPs with the exceptional attributes of 2D materials. The nanocomposites exhibit enhanced mechanical, thermal, electrical, and radiation shielding properties, making them promising materials for various applications, including use in aerospace, robotics, biomedical devices, and flexible electronics, where lightweight, durable, and multifunctional materials are in high demand. Embodiments provide integration of 2D materials into SMPs (e.g., three-dimensional (3D)-printed SMPs and/or SMPs that can be used for 3D printing), allowing for development of smart and complex-shaped nanocomposites with excellent thermal, mechanical, electrical, and radiation shielding properties.

In an embodiment, a method of fabricating a nanocomposite can comprise: preparing a solution comprising 2D nanoparticles (e.g., nanoplatelets) dispersed in a solvent; applying the solution to a filament of an SMP to give a coated filament; and using the coated filament to 3D print a structure, the structure comprising the nanocomposite. The nanocomposite can have the 2D nanoparticles dispersed in a matrix of the SMP with a dispersion degree (or uniformity) in a range of from 50% to 100% (e.g., at least 60%, at least 70%, at least 80%, at least 85%, at least 90%, at least 95%, or at least 99%). Dispersion degree is measured by the distance between nanoparticles within the polymer matrix. A concentration of the 2D nanoparticles in the solution can be in a range of, for example, from 0.1 wt % to 10 wt %. The applying of the solution to the filament can comprise: disposing the solution in a reservoir cup of an airbrush; securing the reservoir cup with a lid of the airbrush; and using the airbrush to spray the solution on the filament. The spraying of the solution on the filament can comprise spraying with a standoff distance between the airbrush and the filament (i.e., the SMP) in a range of, for example, from 5 centimeters (cm) to 30 cm and with a solution feed rate in a range of, for example, from 1 centimeter per second (cm/s) to 30 cm/s. A nozzle diameter of the airbrush can be in a range of, for example, from 0.1 millimeters (mm) to 1.5 mm; the spraying of the solution on the filament can be performed at a temperature in a range of, for example, from 20° C. to 30° C. and a pressure in a range of, for example, from 0.8 atmosphere (atm) to 1.2 atm; and/or a number of layers of the solution applied during the spraying of the solution on the filament can be in a range of, for example, from 1 layer to 10 layers. The using of the coated filament to 3D print a structure can comprise 3D printing with: an infill density of, for example, at least 99%; an extruder temperature of, for example, at least 150° C.; a build plate temperature in a range of, for example, from 15° C. to 35° C.; and/or a printing speed of, for example, at least 5 millimeters per second (mm/s). The 2D nanoparticles can be, for example, graphene (Gr), hexagonal boron nitride (hBN), or tungsten disulfide ($WS_2$). The method can further comprise, before using the coated filament to 3D print a structure, drying the coated filament in an oven at a temperature below a glass transition temperature of the SMP. The method can further comprise, before using the coated filament to 3D print a structure, generating a 3D printing model design. The 3D printing model design can have a wall thickness of the structure of, for example, at least two times a bend thickness of the structure.

In another embodiment, a method of fabricating a nanocomposite can comprise: preparing a solution comprising 2D nanoparticles dispersed in a solvent; performing 3D printing using a filament of an SMP; and applying the solution between each layer of the SMP during the 3D printing to give a structure, the structure comprising the nanocomposite. The nanocomposite can have the 2D nanoparticles dispersed in a matrix of the SMP with a dispersion degree (or uniformity) in a range of from 50% to 100% (e.g., at least 60%, at least 70%, at least 80%, at least 85%, at least 90%, at least 95%, or at least 99%). A concentration of the 2D nanoparticles in the solution can be in a range of, for example, from 0.1 wt % to 10 wt %. The applying of the solution between each layer of the SMP can comprise: disposing the solution in a reservoir cup of an airbrush; securing the reservoir cup with a lid of the airbrush; and using the airbrush to spray the solution between each layer of the SMP. The spraying of the solution between each layer of the SMP can comprise: spraying with a standoff distance between the airbrush and the SMP in a range of, for example, from 5 cm to 30 cm and with a solution feed rate in a range of, for example, from 1 cm/s to 30 cm/s. A nozzle diameter of the airbrush can be in a range of, for example, from 0.1 mm to 1.5 mm; the spraying of the solution between each layer of the SMP can be performed at a temperature in a range of, for example, from 20° C. to 30° C. and a pressure in a range of, for example, from 0.8 atm to 1.2 atm; and/or a number of layers of the solution applied during the spraying of the solution between each layer of the SMP (i.e., the number of layers between each layer of SMP) can be in a range of, for example, from 1 layer to 5 layers. The performing of the 3D printing can comprise 3D printing with: an infill density of, for example, at least 99%; an extruder temperature of, for example, at least 150° C.; a build plate temperature in a range of, for example, from 15° C. to 35° C.; and/or a printing speed of, for example, at least 5 mm/s. The 2D nanoparticles can be, for example, Gr, hBN, or $WS_2$. The spraying of the solution between each layer of the SMP can comprise waiting at least 5 seconds (e.g., at least 10 seconds) between spraying the solution and 3D printing a next layer of the SMP (to allow time for the solution to dry). The method can further comprise, before performing the 3D printing, generating a 3D printing model design. The 3D printing model design can have a wall thickness of the structure of, for example, at least two times a bend thickness of the structure.

In another embodiment, a method of fabricating a nanocomposite can comprise: preparing a solution comprising 2D nanoparticles dispersed in a solvent; applying the solution to a filament of an SMP to give a coated filament; generating a 3D printing model design of a structure; performing 3D printing using the coated filament; and applying the solution between each layer of the SMP during the 3D printing to give the structure, the structure comprising the nanocomposite. The method can further comprise allowing the coated filament to dry before using it for 3D printing. The method can further comprise any or all of the features, steps, or substeps described in the previous two paragraphs.

In another embodiment, a nanocomposite can comprise an SMP and 2D nanoparticles dispersed in the matrix of the SMP with a dispersion degree (or uniformity) in a range of from 50% to 100% (e.g., at least 60%, at least 70%, at least 80%, at least 85%, at least 90%, at least 95%, or at least 99%). The nanocomposite can be fabricated by a method as described in any of the three previous paragraphs.

BRIEF DESCRIPTION OF DRAWINGS

FIG. 5a shows a 2D material coating of a filament surface of SMPU. The top portion of FIG. 5a shows a closeup of the filament; the scale bar is 5 mm. The bottom portion of FIG. 5a shows a microscopic view of a cross-section taken through the dotted line of the top portion of FIG. 5a; the scale bar is 100 μm.

FIG. 5b shows 2D material coating of a filament surface of SMPU. The top portion of FIG. 5b shows a closeup of the filament; the scale bar is 5 mm. The bottom portion of FIG. 5b shows a microscopic view of a cross-section taken through the dotted line of the top portion of FIG. 5b; the scale bar is 100 μm. The filament in FIG. 5b is at a later stage of spraying of the 2D material on the filament compared with FIG. 5a.

FIG. 5c shows a 2D material coating of a filament surface of SMPU. The top portion of FIG. 5c shows a closeup of the filament; the scale bar is 5 mm. The bottom portion of FIG. 5c shows a microscopic view of a cross-section taken through the dotted line of the top portion of FIG. 5c; the scale bar is 100 μm. The filament in FIG. 5c is at a later stage of spraying of the 2D material on the filament compared with FIG. 5b.

FIG. 6a shows 12 images of the antennas from FIG. 4b, four images each at three different times (t=0 seconds(s) in the first column of images, t=3 s in the second column of images, and t=6 s in the third column of images). In each image, the (white) antenna on the left is the antenna 3D-printed using a filament of neat SMPU, and the (black) antenna on the right is the antenna 3D-printed using a filament of SMPU coated with Gr. These images demonstrate the shape memory effect of icosahedron-shaped parts (opening motion).

FIG. 6b shows a plot of shape recovery ratio (Rr) (in percentage (%)) versus time (in s), for the two antennas shown in FIGS. 4b and 6a. The (orange) curve with the lower Rr value at a time of 3 s is for the antenna 3D-printed using a filament of neat SMPU; and the (yellow) curve with the higher Rr value at a time of 3 s is for the antenna 3D-printed using a filament of SMPU-Gr.

FIG. 6c shows a table of shape recovery speed (Rr/time, in %/s) for the two antennas shown in FIGS. 4b and 6a.

FIG. 7 shows three images each at four different times (t=0 s in the first column of images, t=10 s in the second column of images, t=20 seconds in the third column of images, and t=30 seconds in the fourth column of images). In each image, the (white) part on the lower-right is the part 3D-printed using a filament of neat SMPU, and the (black) part on the upper-left is the part 3D-printed using a filament of SMPU coated with Gr. These images demonstrate the shape memory effect of icosahedron-shaped parts (opening motion).

FIG. 8 shows images at 12 different times, with the time for each image labeled in the upper-left corner thereof. These images demonstrate the shape memory effect of an icosahedron-shaped part (closing motion).

DETAILED DESCRIPTION

Figure 1:
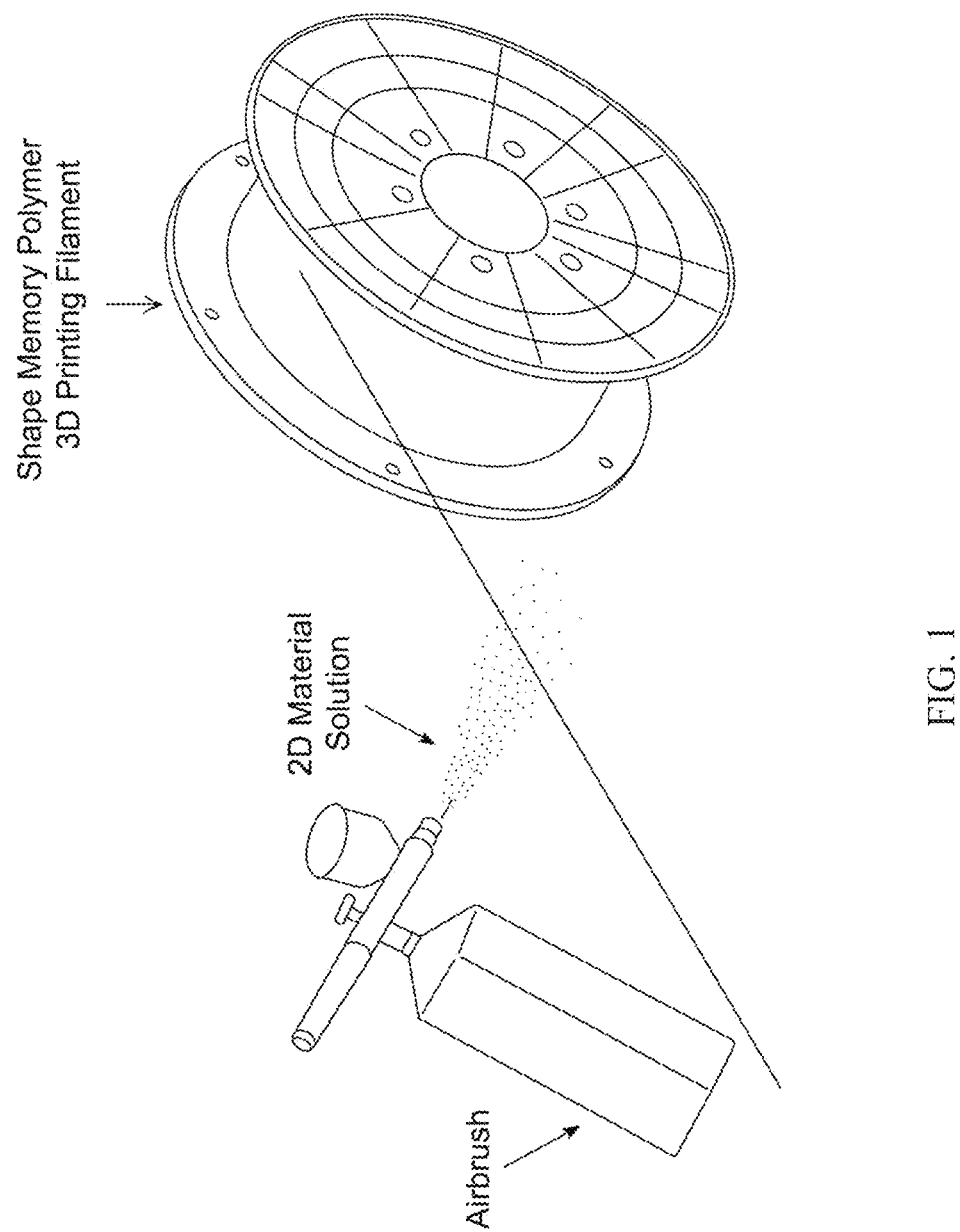
FIG. 1 shows a schematic view of two-dimensional (2D) material coating a three-dimensional (3D) shape memory polymer (SMP) filament surface, according to an embodiment of the subject invention.

Embodiments of the subject invention provide novel and advantageous nanocomposites and fabrication methods thereof. The nanocomposites can include two-dimensional (2D) material and one or more shape memory polymers (SMPs), thereby combining the unique properties of SMPs with the exceptional attributes of 2D materials. The nanocomposites exhibit enhanced mechanical, thermal, electrical, and radiation shielding properties, making them promising materials for various applications, including use in aerospace, robotics, biomedical devices, and flexible electronics, where lightweight, durable, and multifunctional materials are in high demand. Embodiments provide integration of 2D materials into SMPs (e.g., three-dimensional (3D)-printed SMPs and/or SMPs that can be used for 3D printing), allowing for development of smart and complex-shaped nanocomposites with excellent thermal, mechanical, electrical, and radiation shielding properties.

SMPs can respond to certain stimuli, such as temperature changes, and deform from a temporary shape to an original shape (or vice versa), but on their own they can have poor mechanical, thermal, electrical, and radiation shielding properties. 2D materials, such as graphene (Gr) and hexagonal boron nitride (hBN), are single-layered nanomaterials that can be used as SMP composite fillers in embodiments of the subject invention. The high surface area of 2D materials contributes to a strong interaction with the polymer matrix if these particles are well-dispersed. Graphene can be an effective SMP nanofiller due to its superior mechanical (Young's modulus (E) up to 1 teraPascal (TPa)), thermal (thermal conductivity (k) up to 4000 Watts per meter per Kelvin (W/m-K)), and electrical (electrical conductivity (c) up to 1740 Siemens per meter (S/m)) properties. Due to its high thermal conductivity, the addition of Gr into SMPs can improve the shape memory properties of an SMP. Hexagonal boron nitride nanoplatelets can be outstanding nanofillers due to their superior mechanical strength (E up to 0.9 TPa), high thermal conductivity (k up to 600 W/m-K), electrically insulating behavior (band gap ($E_g$) of 6.08 electron Volts (eV)), neutron shielding capability (thermal neutron absorption cross section of $^{10}B=3835$ barns), and oxidation resistance (up to 850° C.).

A significant challenge with integrating nano-sized 2D fillers in polymer matrices is their tendency towards agglomeration, which has detrimental effects on the nanocomposite properties. Achieving a uniform dispersion with conductive nanofillers in polymer matrices is very challenging due to the re-stacking of layers, non-uniformity in distribution, higher inter-sheet contact resistance, and van der Waals forces. An additional challenge with fabrication methods of related art SMP-based material nanocomposites is that these are limited to bulk fabrication techniques such as solution blending, melt mixing, or in situ polymerization. These techniques typically rely on molds or templates, which limit the range of possible geometries. Achieving complex or intricate shapes via these techniques is challenging due to the constraints imposed by the mold design and material flow during processing.

3D printing enables the fabrication of intricate and customizable geometries. By using computer-aided design (CAD) software, complex shapes can be precisely defined and translated into printable files. This additive manufacturing technique allows for layer-by-layer deposition of materials, enabling the production of complex geometries with high accuracy and repeatability. Embodiments of the subject invention include straightforward and scalable methods to overcome the agglomeration and limited geometry challenges in SMP-2D material nanocomposites.

Embodiments of the subject invention provide complex-shaped and multifunctional 3D-printed SMP/2D material nanocomposites. The nanocomposites can have uniform dispersion (or near-uniform dispersion) of the 2D materials into the SMP matrix, overcoming the agglomeration challenge in SMP-2D material composites. That is, the nanocomposites can have a dispersion degree in a range of from 50% to 100% (e.g., at least 60%, at least 70%, at least 80%, at least 85%, at least 90%, at least 95%, or at least 99%). Dispersion degree is typically represented by a percentage (can be a ratio instead) and is a measure of how well-distributed the nanoparticles are within the polymer matrix. It is quantified by measuring the distance between nanoparticles in the polymer from image analysis. A higher dispersion degree means closer to uniform dispersion (i.e., less agglomeration), and composites with very high dispersion (i.e., low particle agglomeration) have a dispersion degree close to (or at) 100% while composites with high particle agglomeration have a dispersion degree lower than 50%.

Figure 2A:
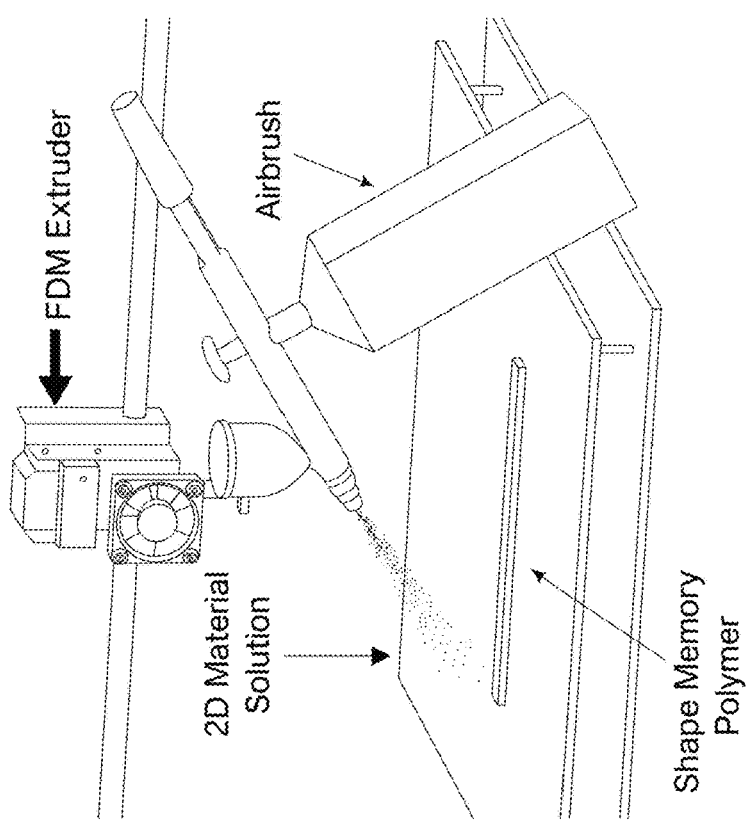
FIG. 2a shows a schematic view of 2D material spraying during 3D printing setup, according to an embodiment of the subject invention.
Figure 2B:
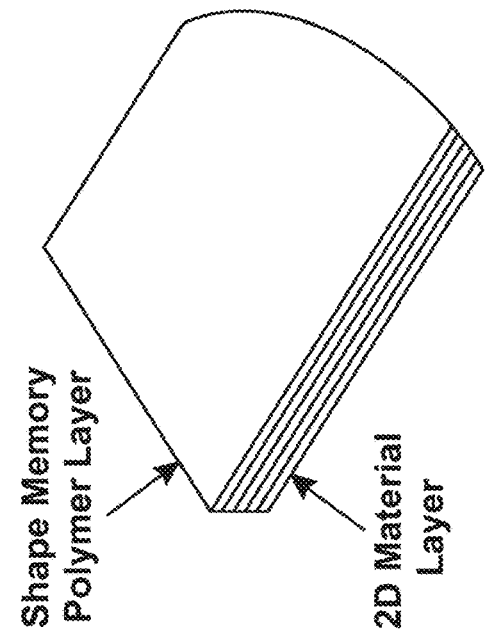
FIG. 2b shows a schematic view of 2D material layers between SMP layers.

Fabrication methods of embodiments of the subject invention can include: 2D material surface coating of an SMP filament that can be used for 3D printing (see also FIG. 1); and/or spraying of 2D materials between 3D-printed SMP layers (see also FIGS. 2a and 2b). These approaches can be applied either individually or in tandem to develop advanced SMP-2D material nanocomposites. Both of the these methods are highly versatile and adaptable to existing fused deposition modeling (FDM) systems.

The 2D material surface coating of an SMP filament that can be used for 3D printing, as shown in FIG. 1, can include the following numbered steps (A1-A5).

A1. 2D material dispersion in solution: The 2D nanoparticles (e.g., Gr, hBN, tungsten disulfide ($WS_2$)), which can be for example nanoplatelets, can be dispersed in a compatible solvent (e.g., acetone, isopropanol alcohol, deionized water). The solution 2D material concentration can be in a range of from, for example, 0.01 wt % to 20 wt % (e.g., 0.1 wt. % to 10 wt. %). It must be ensured that the 2D material concentration does not saturate the solution. Additional dispersing agents can be added in this step if needed to ensure stable dispersions.

Figures 3A, 3B:
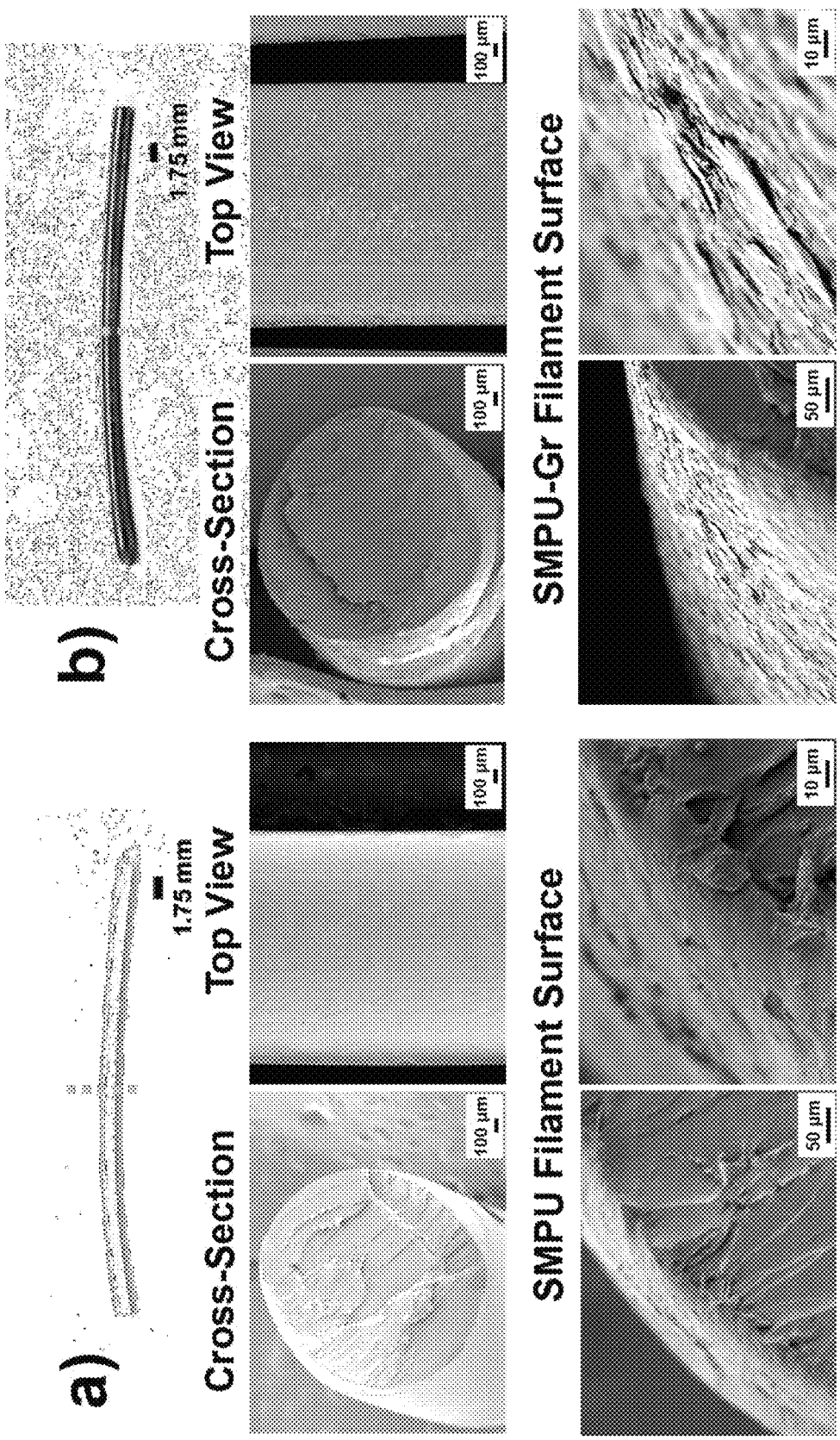
FIG. 3a shows microscope views of a filament of neat shape memory polyurethane (SMPU). The top portion of FIG. 3a shows the filament; the scale bar is 1.75 millimeters (mm). The portion labeled "cross-section" shows a cross-sectional view of the filament, taken through the dotted line from the top portion of FIG. 3a; the scale bar is 100 μm. The portion labeled "top view" shows a top view of the filament; the scale bar is 100 μm. The portion labeled "SMPU filament surface" shows two views of the surface of the filament; the lefthand image has a scale bar of 50 μm, and the righthand image has a scale bar of 10 μm.
FIG. 3b shows microscope views of a filament of SMPU coated with graphene (Gr). The top portion of FIG. 3b shows the filament; the scale bar is 1.75 mm. The portion labeled "cross-section" shows a cross-sectional view of the filament, taken through the dotted line from the top portion of FIG. 3b; the scale bar is 100 μm. The portion labeled "top view" shows a top view of the filament; the scale bar is 100 μm. The portion labeled "SMPU-Gr filament surface" shows two views of the surface of the filament; the lefthand image has a scale bar of 50 μm, and the righthand image has a scale bar of 10 μm.

A2. 2D material solution coating onto 3D printing SMP filament: The solution can be poured into a container, such as a fluid reservoir cup of an airbrush. Then, the reservoir cup can be secured with its lid. The filament can be sprayed using an airbrush or functionally equivalent tool to apply the 2D material to the filament. The spraying can be done with a continuous and/or stable motion. FIG. 3a shows micrographs of neat shape memory polyurethane (SMPU), and FIG. 3b shows micrographs of Gr-coated SMPU filaments. The following spraying parameters can be followed: a standoff distance in a range of from 1 centimeter (cm) to 50 cm (e.g., 5 cm to 30 cm); a nozzle diameter in a range of from 0.05 millimeters (mm) to 3 mm (e.g., 0.1 mm to 1.5 mm); a solution feed rate in a range of from 0.1 centimeters per second (cm/s) to 50 cm/s (e.g., 1 cm/s to 30 cm/s); a temperature in a range of from 15° C. to 35° C. (e.g., 20° C. to 30° C., such as 25° C. or about 25° C.); a pressure in a range of from 0.8 atmosphere (atm) to 1.2 atm (e.g., 0.9 atm to 1.1 atm, such as 1 atm or about 1 atm); and a number of coatings in a range of from 1 layer to 20 layers (e.g., 1 layer to 10 layers).

A3. Drying of 2D material coated 3D printing SMP filament: It can be ensured that the coatings are fully dry and no moisture is retained. If the filament retains moisture, the print quality can be reduced, the extruder nozzle may clog, dimensional accuracy may be lost, and/or the part's properties may be negatively affected. If needed, oven drying can be conducted. The SMP filament must be dried below its glass transition temperature (Tg), which can vary from 40°

C. to 80° C. depending on the SMP composition. The drying time can vary from, for example, 1 hour (hr) to 10 hr (e.g., 4 hr to 8 hr).

A4. 3D printing model design: In some embodiments, the following geometry relationships can be followed for models that are intended to follow folding and unfolding motions, as observed in FIG. 4a. The following relationship can help ensure the model folds and recovers fully: a wall thickness in a range of from 1.5*(bend thickness) to 2.5*(bend thickness) or more (e.g., 2*(bend thickness), about 2*(bend thickness), or at least 2*(bend thickness)).

A5. 3D printing: In some embodiments, the following printing parameters can be followed: an infill density of at least 90% (e.g., at least 95%, at least 99%, at least 99.9%, or 100%); a printing temperature of at least 150° C. (e.g., at least 160° C., at least 170° C., at least 180° C., at least 190° C., at least 200° C., 200° C., or about 200° C.); a build plate temperature of at least 15° C. (e.g., in a range of from 15° C. to 35° C., in a range of from 20° C. to 30° C., 25° C., or about 25° C.); and a printing speed of at least 5 millimeters per second (mm/s) (e.g., at least 10 mm/s, at least 15 mm/s, at least 20 mm/s, at least 25 mm/s, at least 30 mm/s, in a range of from 5 mm/s to 100 mm/s, in a range of from 20 mm/s to 40 mm/s, 30 mm/s, or about 30 mm/s).

Figure 4B:
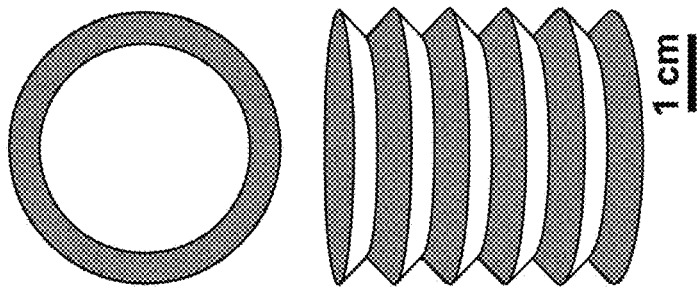
FIG. 4b shows images of 3D-printed accordion-shaped antennas (printed according to the specifications from FIG. 4a). The image labeled "Neat SMPU" shows an image of an antenna 3D-printed using a filament of neat SMPU, and the image labeled "SMPU-Gr" shows an image of an antenna 3D-printed using a filament of SMPU coated with Gr.
Figure 4B:
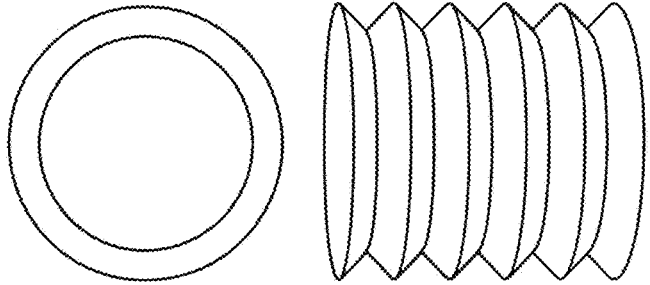
Figure 4A:
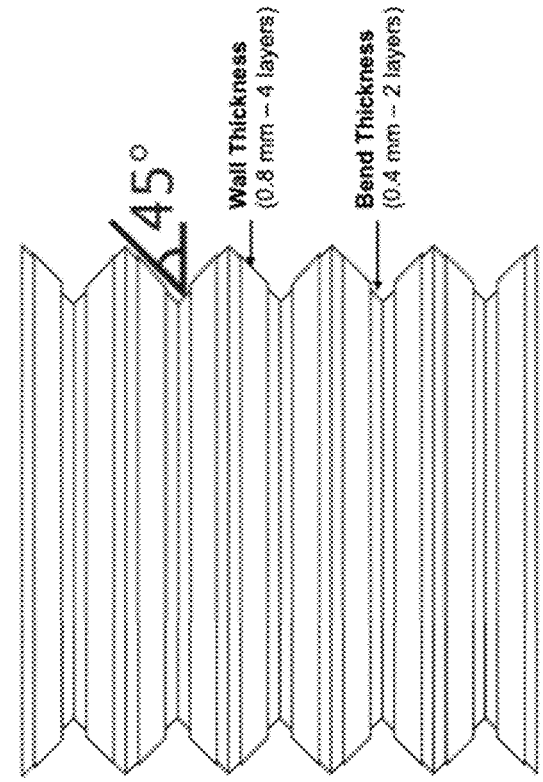
FIG. 4a shows a side view of an accordion-shaped antenna that can be fabricated, according to an embodiment of the subject invention. Though FIG. 4a lists certain thicknesses and angles, these are for exemplary purposes only and should not be construed as limiting.

FIG. 4b shows an accordion shaped antenna printed using steps A1-A5. The approach of 2D material surface coating of an SMP filament that can be used for 3D printing can be adapted to FDM systems with multiple extruders where different filaments can be modified with multiple 2D materials (some or all of which can be the same as each other). Alternatively, different sections of a single SMP spool can be coated with different 2D materials. These approaches can enable composition tailoring across a single 3D printed part. As a result, property engineering across a complex geometry can be enabled.

The spraying of 2D materials between 3D-printed SMP layers, which can be observed in FIG. 2a, can result in an interlayered structure, as FIG. 2b shows. This include the following numbered steps (B1-B3b).

B1. 2D material dispersion in solution: The 2D nanoparticles (e.g., Gr, hBN, WS$_2$), which can be for example nanoplatelets, can be dispersed in a compatible solvent (e.g., acetone, isopropanol alcohol, deionized water). The solution 2D material concentration can be in a range of from, for example, 0.01 wt % to 20 wt % (e.g., 0.1 wt. % to 10 wt. %). It must be ensured that the 2D material concentration does not saturate the solution. Additional dispersing agents can be added in this step if needed to ensure stable dispersions.

B2. 3D printing model design: In some embodiments, the following geometry relationships can be followed for models that are intended to follow folding and unfolding motions, as observed in FIG. 4a. The following relationship can help ensure the model folds and recovers fully: a wall thickness in a range of from 1.5*(bend thickness) to 2.5*(bend thickness) (e.g., 2*(bend thickness) or about 2*(bend thickness)).

B3a. 3D printing: In some embodiments, the following printing parameters can be followed: an infill density of at least 90% (e.g., at least 95%, at least 99%, at least 99.9%, or 100%); a printing temperature of at least 150° C. (e.g., at least 160° C., at least 170° C., at least 180° C., at least 190° C., at least 200° C., 200° C., or about 200° C.); a build plate temperature of at least 15° C. (e.g., in a range of from 15° C. to 35° C., in a range of from 20° C. to 30° C., 25° C., or about 25° C.); and a printing speed of at least 5 mm/s (e.g., at least 10 mm/s, at least 15 mm/s, at least 20 mm/s, at least 25 mm/s, at least 30 mm/s, in a range of from 5 mm/s to 100 mm/s, in a range of from 20 mm/s to 40 mm/s, 30 mm/s, or about 30 mm/s).

B3b. interlayer 2D material spraying: The solution can be poured into a container, such as a fluid reservoir cup of an airbrush. Then, the reservoir cup can be secured with its lid. The filament can be sprayed using an airbrush or functionally equivalent tool to apply the 2D material to the filament. The spraying can be done with a continuous and/or stable motion. The following spraying parameters can be followed: a standoff distance in a range of from 1 cm to 50 cm (e.g., 5 cm to 30 cm); a nozzle diameter in a range of from 0.05 mm to 3 mm (e.g., 0.1 mm to 1.5 mm); a solution feed rate in a range of from 0.1 cm/s to 50 cm/s (e.g., 1 cm/s to 30 cm/s); a temperature in a range of from 15° C. to 35° C. (e.g., 20° C. to 30° C., such as 25° C. or about 25° C.); a pressure in a range of from 0.8 atm to 1.2 atm (e.g., 0.9 atm to 1.1 atm, such as 1 atm or about 1 atm); and a number of coatings (between each SMP layer) in a range of from 1 layer to 20 layers (e.g., 1 layer to 10 layers, or 1 layer to 5 layers).

FIG. 2b shows the SMP-2D material interlayered structure obtained through the approach of steps B1-B3b. Similarly, the spraying of 2D materials between 3D-printed SMP layers approach can integrate different 2D material layers within a single 3D printed part. Thus, the composition and properties of a complex geometry can be finely tailored.

Embodiments of the subject invention allow for the fabrication of 3D-printed SMP-2D material nanocomposites. The fabrication methods are highly scalable, and large and complex 3D-printed SMP-2D material nanocomposites can be fabricated in a short period of time.

Related art SMP-based nanocomposites are limited to mechanical shear and chemical dispersion techniques. The existing mechanical shear techniques include vortex or melt mixing, solution blending, ball milling, bath sonication, and tip sonication. Chemical dispersion techniques involve acid functionalization. These techniques face multiple challenges in terms of limited part geometry complexity and 2D material agglomeration (e.g., dispersion degree of less than 50%) within the SMP matrix. These techniques typically rely on molds or templates, which limit the range of possible geometries. Achieving complex or intricate shapes via these techniques is challenging due to the constraints imposed by the mold design and material flow during processing.

Due to the π-π interactions between 2D materials, the particles tend to agglomerate when mixed with SMP matrices. In other words, the nanoparticle dispersion within the matrix is poor and uneven. This clustering limits the interfacial interaction between the filler and the SMP by preventing or inhibiting uniform nanomaterial distribution. Thus, relying on mechanical shear force to disperse 2D material particles is not viable for high-quality composites. Also, the chemical dispersion approaches involve highly toxic acids that are non-environmentally friendly and hinder their processing scalability. Hence, the related art methods to fabricate SMP-based composites are limited to simple shape geometries, non-scalable, time-consuming, and likely to result in non-uniform composites.

Embodiments of the subject invention provide facile and scalable processing routes for well-dispersed SMP-2D material composites that enable complex part processing. High-quality, non-agglomerated SMP-2D material nanocomposites of complex geometries cannot be fabricated through related art methodologies. In related art methods, due to nanoparticle agglomeration, the mechanical, thermal, and electrical properties are hindered. These nanoparticle clusters result in stress concentration locations and severely deteriorating mechanical properties. Similarly, 2D material agglomerates would result in phonon and electron scattering centers, which in turn, lower the thermal and electrical conductivities of the composites. In addition, in terms of neutron radiation shielding properties, the non-uniform dispersion of the radiation shielding 2D material nanoparticles would decrease the neutron absorption exposed surface. Consequently, the full neutron radiation shielding potential of a 2D material would be underutilized. Therefore, 2D material agglomerations have a negative effect on the composite performance.

An additional challenge with the related art SMP-based processing techniques is their inherent limitation when it comes to fabricating structures with intricate geometries. This restriction significantly curtails their potential in various technological applications that require complex and sophisticated designs. Additional post-processing steps, such as machining, are necessary to refine and modify the structures obtained through the initial fabrication process. While machining offers a potential solution for generating intricate geometries, it introduces a host of new challenges and drawbacks, including cost increase, fabrication time elongation, and potential material damage. The inclusion of machining as a secondary step significantly increases the overall cost of the manufacturing process due to the additional machinery, tools, and expertise required. In addition, the incorporation of post-processing methods like machining invariably elongates the production timeline. This time-consuming nature of post-processing not only impedes rapid prototyping but also limits scalability in large-scale manufacturing scenarios. Also, the introduction of machining introduces an inherent risk of material damage or degradation. The precise nature of machining techniques often involves cutting and grinding the material, which can lead to unintended alterations or inconsistencies in the structure. This compromised integrity may affect the overall performance, reliability, and functionality of the final product.

Embodiments of the subject invention provide SMP-2D material fabrication methodologies that overcome the challenges with related art techniques. Through the incorporation of 2D materials into SMP 3D printing techniques, complex structures with uniform nanoparticle distribution can be fabricated without the need for additional post-processing steps (e.g., post-processing steps such as machining may be explicitly omitted from the fabrication methods). By leveraging additive manufacturing, intricate SMP-2D material designs can be translated into physical structures with minimal additional processing requirements. This not only reduces costs but also streamlines the production timeline, enabling faster iterations and prototyping.

Figures 5A, 5B, 5C:
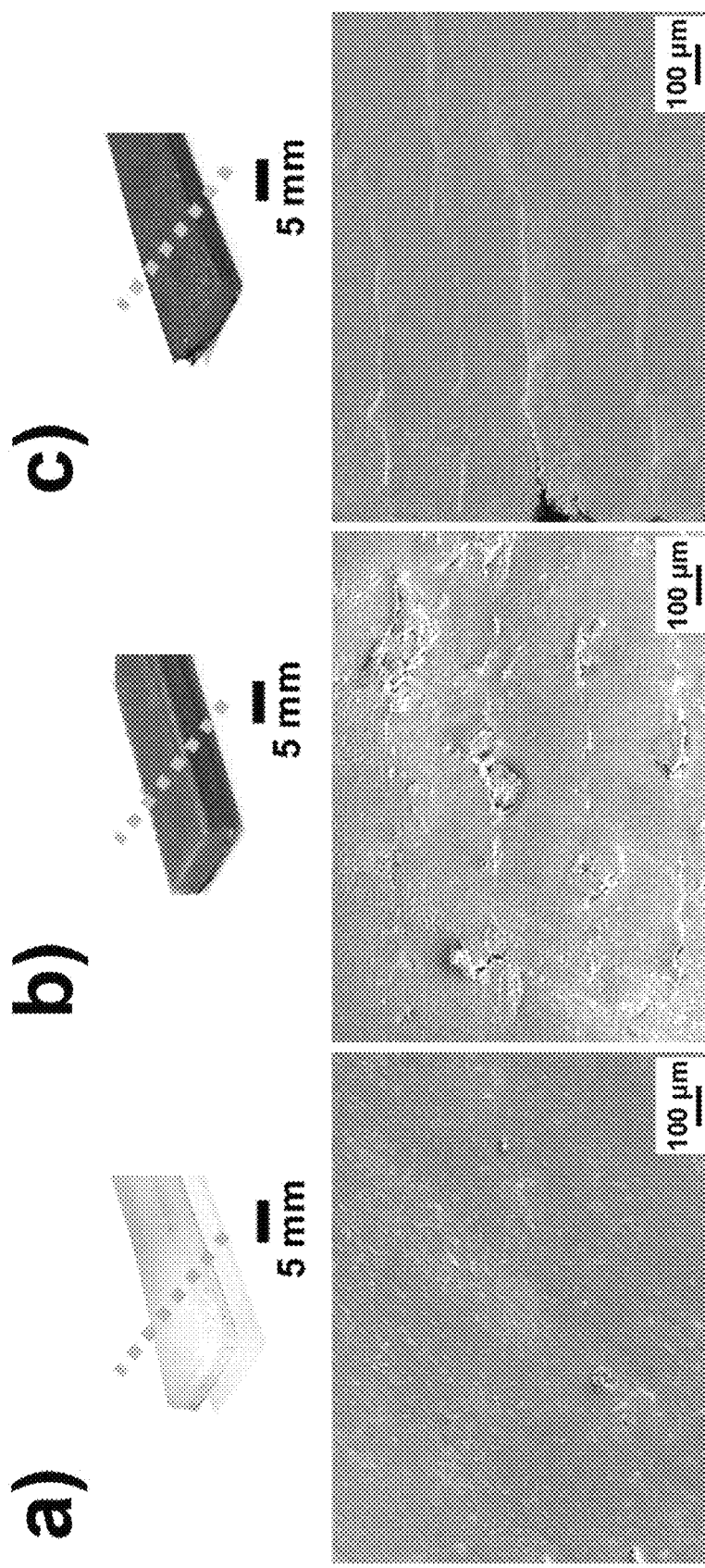

Embodiments of the subject invention overcome the challenges related to the agglomeration of 2D material particles within the SMP matrix. The 2D material surface coating technique for 3D printing SMP filament ensures even dispersion of nanoparticles on the filament surface before FDM. This method allows precise control over the quantity of 2D material particles incorporated into the SMP matrix. FIG. 5a shows the cross-section of a bar 3D printed with neat SMPU. When the coated filament was melted in the FDM extruder, the 2D materials seamlessly integrated into the SMP matrix, resulting in uniform layers, as observed in FIG. 5b. The utilization of the 2D material interlayer spraying technique guarantees a uniform dispersion of 2D material particles between the layers of SMP during 3D printing, as observed in FIG. 5c. This approach enables precise control over the quantity of 2D material particles integrated into the SMP matrix. Additionally, the mechanical, thermal, electrical, and radiation shielding properties of the printed part can be customized by varying the amount of 2D material sprayed across the component. Furthermore, different types of 2D materials can be employed within the same part, providing further versatility in material selection and performance optimization.

Embodiments of the subject invention provide 2D material surface coating of an SMP filament that can be used for 3D printing, including modification of the surface of SMP 3D printing filament via 2D material spraying. The 2D material dispersion and spraying parameters are discussed in step A2 above, including standoff distance, nozzle diameter, solution feed rate, temperature, pressure, and number of coatings. The parameters during 3D printing are discussed in step A5 above, including infill density, extruder temperature, build plate temperature, and printing speed. The 3D printing CAD geometry relationships for any foldable structure can be used, and in some embodiments, the wall thickness of the 3D-printed part is at least twice that of the crease or vertex thickness.

Embodiments of the subject invention provide spraying of 2D materials between 3D-printed SMP layers to produce sandwiched 2D material-SMP composites. The dispersion and spraying parameters are discussed in step B3b above, including standoff distance, nozzle diameter, solution feed rate, temperature, pressure, and number of coatings. The parameters for 3D printing of SMP filament for interlayer 2D material spraying are discussed in step B3a above, including infill density, extruder temperature, build plate temperature, and printing speed. The 3D printing CAD geometry relationships can produce a fully interconnected 2D material network within the SMP matrix, where the overlap between layers can be at least 30%.

Due to the versatile nature, embodiments of the subject invention have an extremely wide range of applications. Applicable industries include radiation shielding technologies, thermal management materials, self-folding antennas and satellites, robotics, thermally triggered actuators, structural materials, aerospace components, automobile structures, aeronautic parts, and electronic packaging.

No related art methods exist to fabricate well-dispersed SMP-2D material composites with complex shapes. Related art methods for fabricating SMP-based composites produce composites with reinforcement aggregations within the SMP matrices, which is a major disadvantage. In addition, related art methods are limited to the bulk production of SMP-based composites, which limits their application in fields that require complex shapes. Embodiments of the subject invention overcome the agglomeration challenges, increasing the technology value and allowing for fabrication of complex shaped parts using SMP-2D material nanocomposites.

The fabrication methods of embodiments of the subject invention are highly versatile and can be applied independently or in conjunction. In addition, these methods can be adapted to fabricate composites of multiple material systems. Further, the methods are straightforward, affordable, and scalable, opening many possibilities in the field of SMP-2D material composites.

Embodiments of the subject invention allow for the production of high-quality and uniformly dispersed SMP-2D material parts. Methods are affordable, highly scalable, non-toxic, and environmentally friendly. The unique combination of spray coating and 3D printing unlocks the possibility of producing complex and high-quality SMP-2D material parts. The established geometric relationships that dictate that the CAD model wall thickness can be a minimum of twice the crease thickness can ensure the foldability of the produced parts. The fabrication methods can include use of conventional FDM 3D printers, airbrushes, and/or bath sonication, meaning they are straightforward and can be easily scaled up from laboratory to industry. The fabrication methods offer the ability to tailor the nanocomposite properties by controlling the quantity of 2D material coatings onto the SMP filament or 3D printed parts. The fabrication methods also offer the ability to tailor the properties by designing the composition of 2D materials. The approach of 2D material surface coating of SMP filaments that can be used for 3D printing can be adapted to FDM systems with multiple extruders where different filaments can be modified with multiple 2D materials. Alternatively, different sections of a single SMP spool can be coated with different 2D materials. These approaches can enable composition tailoring across a single 3D printed part. The two main fabrication methods can be applied independently or in conjunction, further opening new possibilities for property tailoring of a single 3D printed part.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

SMPU-Gr composites were fabricated applying the two methodologies: 2D material surface coating of an SMP filament that can be used for 3D printing; and spraying of 2D materials between 3D-printed SMP layers. The shape memory effect was quantified for the SMPU-Gr composites fabricated via 2D material surface coating of an SMP filament that can be used for 3D printing.

Example 1—2D Material Surface Coating of an SMP Filament that can be Used for 3D Printing In order to validate and test the 2D material surface coating of an SMP filament that can be used for 3D printing, the surface of a 3D printing SMPU filament was coated with Gr. The coating solution was prepared by dispersing 1 wt. % of Gr nanoplatelets in acetone via bath sonication for 1 hour prior to spraying. The Gr solution was added to the fluid reservoir cup of an airbrush with a 0.3 mm nozzle. The Gr solution was then sprayed onto the SMPU filament at room temperature and atmospheric pressure. The Gr solution was sprayed with a continuous and stable motion. The standoff distance was 20 cm. The solution feed rate was 30 cm/s. A total of 3 Gr layers were sprayed onto the SMPU filament. The Gr-coated SMPU filament was fully dried, so no moisture was retained.

Figure 7:
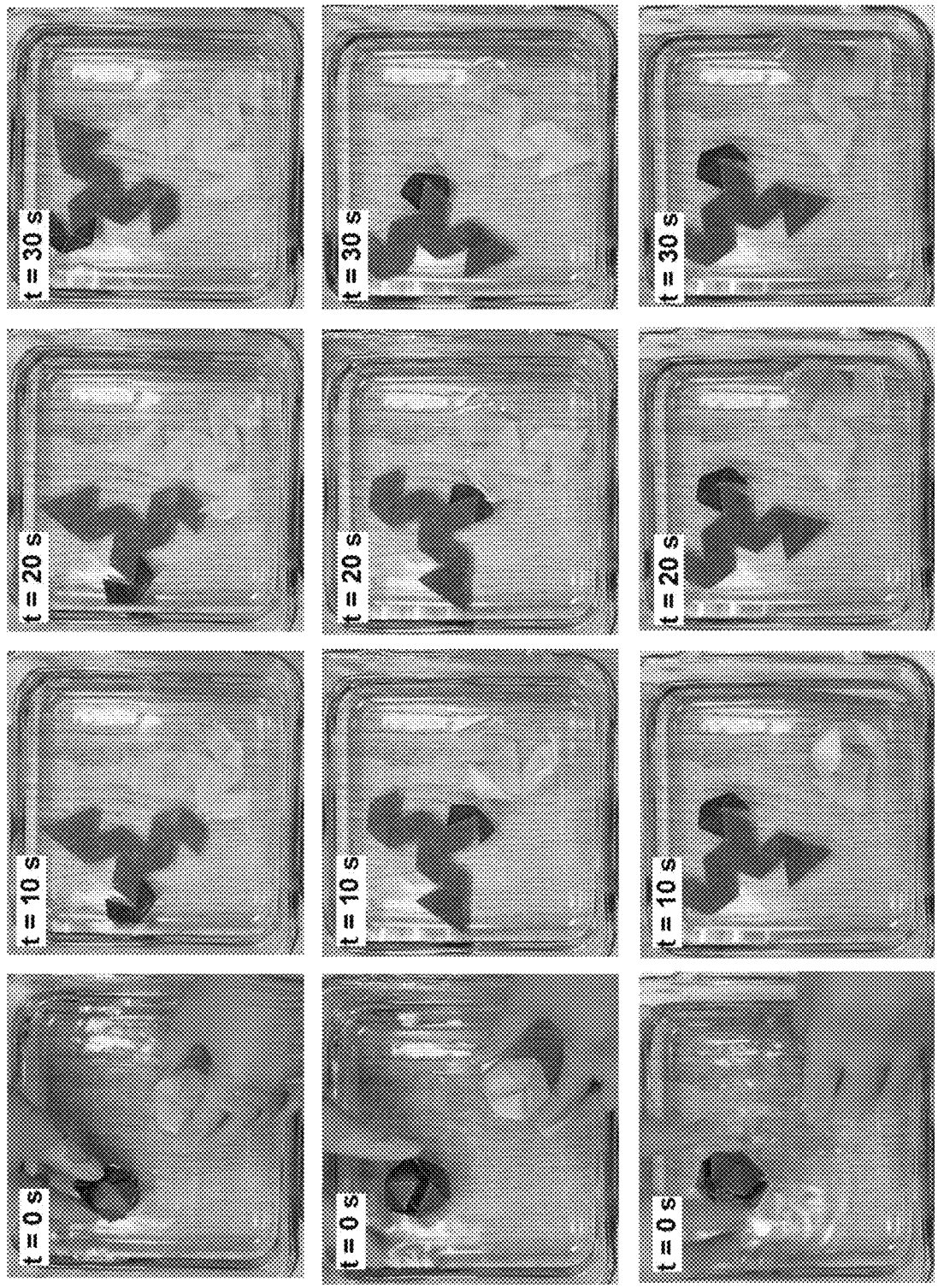
FIG. 7 shows 12 images of icosahedron-shaped parts, one 3D-printed using a filament of neat SMPU and 3D-printed using a filament of SMPU-Gr.
Figure 8:
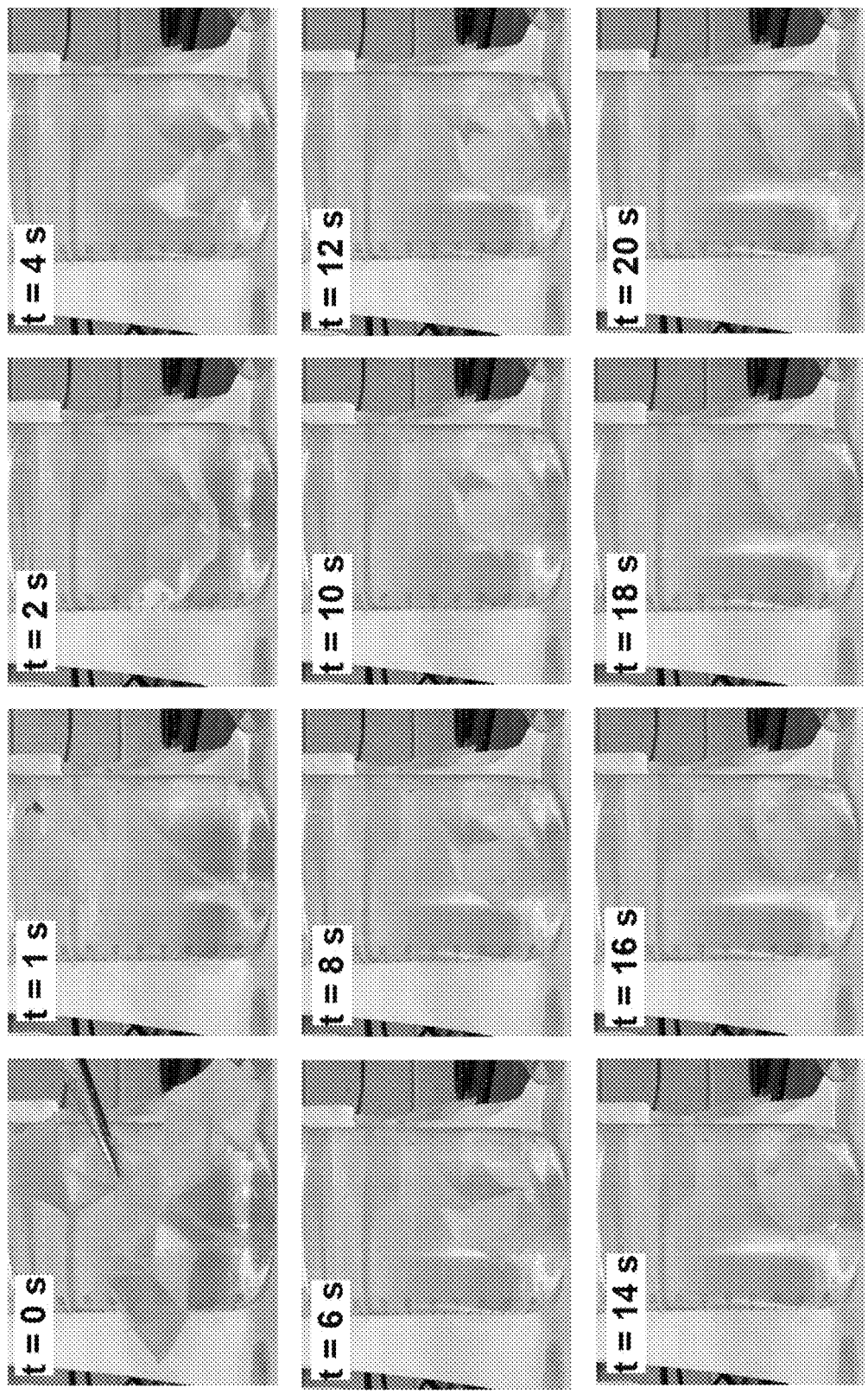
FIG. 8 shows 12 images of an icosahedron-shaped part, 3D-printed using a filament of neat SMPU.

An accordion-shaped antenna and an origami-inspired self-deployable icosahedron shape were 3D printed with the Gr-coated SMPU filament. The CAD models were designed so that the model's wall thicknesses were at least twice that of the bend thicknesses. These relationships ensured the model folds and recovers fully. The parts were 3D printed with a 100% infill density, an extruder temperature of 200° C., a build plate temperature of 25° C., and a speed of 30 mm/s. The shape memory effect was quantified for the SMPU-Gr composites by submersing these in water at 60° C. FIG. 6a shows images of the shape memory effect comparison of accordion-shaped antennas printed with neat SMPU and SMPU-Gr. The effect of Gr on the shape memory behavior of SMPU was quantified by the shape recovery ratio (Rr), as shown in FIG. 6b. The Rr of SMPU-Gr was significantly faster than that of neat SMPU for multiple shape recovery cycles. The initial shape recovery speed of neat SMPU was 5.45 percent per second (%/s) while that of SMPU-Gr was 31.9%/s, 5.85 times faster, as shown in FIG. 6c. FIG. 7 shows the shape memory effect comparison of icosahedron parts printed with neat SMPU and SMPU-Gr. These images show SMPU-Gr was significantly faster than that of neat SMPU for multiple shape recovery cycles. The proof of concept for the closing motion of the icosahedron was demonstrated by a neat SMPU icosahedron, as shown in FIG. 8.

Example 2—Spraying of 2D Materials Between 3D Printed SMP Layers

The spraying of 2D materials between 3D printed SMP layers approach was validated by spraying Gr in between 3D printed SMPU layers. The coating solution was formulated by dispersing 1 wt. % of Gr nanoplatelets in acetone through bath sonication for 1 hour. The Gr solution was introduced into the fluid reservoir cup of an airbrush equipped with a 0.3 mm nozzle.

To start the process, three layers of neat SMPU were printed to ensure stability and adhesion of the print to the printing bed. Once 3 layers of neat SMPU were printed, the Gr solution spraying was performed in between each SMPU layer. The spraying process was performed at room temperature and atmospheric pressure, maintaining a continuous and steady motion. The distance between the airbrush and the surface being coated was kept at 20 cm, while the solution was fed at a rate of 30 cm/s. A total of 5 layers of the Gr solution were evenly sprayed onto the SMPU layers. A 10 second pause was introduced in between each SMPU layer to enable the Gr-acetone solution to fully dry prior to the next layer. The parts were 3D printed using a 100% infill density, with the extruder temperature set to 200° C., the build plate temperature maintained at 25° C., and a printing speed of 30 mm/s.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of fabricating a nanocomposite, the method comprising:
preparing a solution comprising two-dimensional (2D) nanoparticles dispersed in a solvent;
applying the solution to a filament of a shape memory polymer (SMP) to give a coated filament; and
using the coated filament to three-dimensional (3D) print a structure, the structure comprising the nanocomposite,
the applying of the solution to the filament comprising:
disposing the solution in a reservoir cup of an airbrush;
securing the reservoir cup with a lid of the airbrush; and
using the airbrush to spray the solution on the filament,
the spraying of the solution on the filament comprising spraying with a standoff distance between the airbrush and the filament in a range of from 5 centimeters (cm) to 30 cm/s,
a nozzle diameter of the airbrush being in a range of from 0.1 millimeters (mm) to 1.5 mm,
the spraying of the solution on the filament being preformed at a temperature in a range of from 20° C. to 30° C. and a pressure in a range of 0.8 atmosphere (atm) to 1.2 atm,
a number of layers of the solution applied during the spraying of the solution on the filament being in a range of from 1 to 10 layers,
the using of coated filament to 3D print a structure comprising 3D printing with a infill density of at least 99%, an extruder temperature of at least 150° C., a build plate temperature in a range of from 15° C. to 35° C., and a printing speed of at least 5 millimeters per second (mm/s),
the 2D nanoparticles being graphene, hexagonal boron nitride, or tungsten disulfide ($WS_2$), and
the SMP being shape memory polyurethane.

2. The method according to claim 1, a concentration of the 2D nanoparticles in the solution being in a range of from 0.1 wt % to 10 wt %.

3. The method according to claim 1, further comprising, before using the coated filament to 3D print a structure, drying the coated filament in an oven at a temperature below a glass transition temperature of the SMP.

4. The method according to claim 1, further comprising, before using the coated filament to 3D print a structure, generating a 3D printing model design, and
the 3D printing model design having a wall thickness of the structure of at least two times a bend thickness of the structure.

5. A method of fabricating a nanocomposite, the method comprising:
preparing a solution comprising two-dimensional (2D) nanoparticles dispersed in a solvent;
performing three-dimensional (3D) printing using a filament of a shape memory polymer (SMP); and
applying the solution between each layer of the SMP during the 3D printing to give a structure, the structure comprising the nanocomposite,
the applying of the solution to the filament comprising:
disposing the solution in a reservoir cup of an airbrush;
securing the reservoir cup with a lid of the airbrush; and
using the airbrush to spray the solution on the filament,
the spraying of the solution on the filament comprising spraying with a standoff distance between the airbrush and the filament in a range of from 5 centimeters (cm) to 30 cm/s,
a nozzle diameter of the airbrush being in a range of from 0.1 millimeters (mm) to 1.5 mm,
the spraying of the solution on the filament being preformed at a temperature in a range of from 20° C. to 30° C. and a pressure in a range of 0.8 atmosphere (atm) to 1.2 atm,
a number of layers of the solution applied during the spraying of the solution on the filament being in a range of from 1 to 10 layers,
the using of coated filament to 3D print a structure comprising 3D printing with a infill density of at least 99%, an extruder temperature of at least 150° C., a build plate temperature in a range of from 15° C. to 35° C., and a printing speed of at least 5 millimeters per second (mm/s),
the 2D nanoparticles being graphene, hexagonal boron nitride, or tungsten disulfide ($WS_2$), and
the SMP being shape memory polyurethane.

6. The method according to claim 5, a concentration of the 2D nanoparticles in the solution being in a range of from 0.1 wt % to 10 wt %.

7. The method according to claim 5, the spraying of the solution between each layer of the SMP comprising waiting at least 10 seconds between spraying the solution and 3D printing a next layer of the SMP,
the method further comprising, before performing the 3D printing, generating a 3D printing model design, and
the 3D printing model design having a wall thickness of the structure of at least two times a bend thickness of the structure.

8. A method of fabricating a nanocomposite, the method comprising:
preparing a solution comprising two-dimensional (2D) nanoparticles dispersed in a solvent;
applying the solution to a filament of a shape memory polymer (SMP) to give a coated filament;

allowing the coated filament to dry, giving a dry coated filament;

generating a three-dimensional (3D) printing model design of a structure;

performing 3D printing using the dry coated filament; and applying the solution between each layer of the SMP during the 3D printing to give the structure, the structure comprising the nanocomposite, a concentration of the 2D nanoparticles in the solution being in a range of from 0.1 wt % to 10 wt %, the applying of the solution to the filament comprising:
disposing the solution in a reservoir cup of an airbrush;
securing the reservoir cup with a lid of the airbrush; and
using the airbrush to spray the solution on the filament, the applying of the solution between each layer of the SMP comprising using the airbrush to spray the solution between each layer of the SMP, the spraying of the solution on the filament and the spraying of the solution between each layer of the SMP both comprising spraying with a standoff distance between the airbrush and the SMP in a range of from 5 centimeters (cm) to 30 cm and with a solution feed rate in a range of from 1 centimeter per second (cm/s) to 30 cm/s, a nozzle diameter of the airbrush being in a range of from 0.1 millimeters (mm) to 1.5 mm, and the spraying of the solution being performed at a temperature in a range of from 20° C. to 30° C. and a pressure in a range of from 0.8 atmosphere (atm) to 1.2 atm, a number of layers of the solution applied during the spraying of the solution on the filament being in a range of from 1 layer to 10 layers, a number of layers of the solution applied during the spraying of the solution between each layer of the SMP being in a range of from 1 layer to 5 layers, the performing of the 3D printing comprising 3D printing with an infill density of at least 99%, an extruder temperature of at least 150° C., a build plate temperature in a range of from 15° C. to 35° C., and a printing speed of at least 5 millimeters per second (mm/s), the 2D nanoparticles being graphene, hexagonal boron nitride, or tungsten disulfide ($WS_2$), and the SMP being shaped memory polyurethane.

9. The method according to claim 8, the spraying of the solution between each layer of the SMP comprising waiting at least 10 seconds between spraying the solution and 3D printing a next layer of the SMP.

\* \* \* \* \*